(12) United States Patent
Kalinichenko et al.

(10) Patent No.: US 12,021,646 B2
(45) Date of Patent: Jun. 25, 2024

(54) DOCUMENTING MULTIMEDIA COLLABORATION SESSION CONTENT

(71) Applicant: Salesforce, Inc., San Francisco, CA (US)

(72) Inventors: Oleksii Kalinichenko, Burnaby (CA); Akshay Bakshi, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/390,438

(22) Filed: Jul. 30, 2021

(65) Prior Publication Data

US 2023/0032159 A1  Feb. 2, 2023

(51) Int. Cl.
*H04L 12/18* (2006.01)
*H04L 65/1089* (2022.01)
*H04L 65/401* (2022.01)
*H04L 65/403* (2022.01)

(52) U.S. Cl.
CPC ...... *H04L 12/1831* (2013.01); *H04L 65/1089* (2013.01); *H04L 65/4015* (2013.01); *H04L 65/403* (2013.01)

(58) Field of Classification Search
CPC ............. H04L 12/1831; H04L 65/1089; H04L 65/4015; H04L 65/403; H04L 51/32; G06F 17/28

See application file for complete search history.

(56) References Cited

U.S. PATENT DOCUMENTS

| 10,819,532 | B1 * | 10/2020 | van Rensburg | H04L 51/02 |
| 11,153,532 | B1 * | 10/2021 | Gupta | H04N 7/155 |
| 11,256,392 | B2 * | 2/2022 | Ponnusamy | G06F 3/0481 |
| 2006/0080432 | A1 * | 4/2006 | Spataro | H04L 12/1831 |
| | | | | 709/224 |
| 2013/0232203 | A1 * | 9/2013 | Moeinifar | H04L 65/612 |
| | | | | 709/205 |
| 2017/0168692 | A1 * | 6/2017 | Chandra | G06F 3/017 |
| 2017/0310717 | A1 * | 10/2017 | Staples | H04L 65/1093 |

(Continued)

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Joseph L Greene
(74) *Attorney, Agent, or Firm* — Lee & Hayes, P.C.

(57) ABSTRACT

Media, methods, and systems are disclosed for documenting synchronous multimedia collaboration sessions in a group-based communication system. A live synchronous multimedia collaboration session is detected. In response to the detecting, a first audio segment is received and transcribed into a first text segment. A collaboration thread associated with the live synchronous multimedia collaboration session is generated. In real time, a first message is posted based on the first transcribed text segment to the collaboration thread associated with the live synchronous multimedia collaboration session. Next, a second audio segment is received and transcribed into a second text segment. Finally, in real time and during the live synchronous multimedia collaboration session, a second message is posted to the collaboration thread based on the second transcribed text segment.

20 Claims, 7 Drawing Sheets

(56) References Cited

U.S. PATENT DOCUMENTS

| | | | |
|---|---|---|---|
| 2018/0287982 A1 | 10/2018 | Draeger et al. | |
| 2018/0295158 A1* | 10/2018 | Faulkner | H04L 65/1059 |
| 2019/0007228 A1* | 1/2019 | Vuskovic | H04L 12/1827 |
| 2019/0268387 A1* | 8/2019 | Pelton | G06Q 10/10 |
| 2021/0058263 A1* | 2/2021 | Fahrendorff | H04L 67/306 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

DOCUMENTING MULTIMEDIA COLLABORATION SESSION CONTENT

TECHNICAL FIELD

Embodiments of the invention generally relate to processing multimedia content. More specifically, embodiments of the invention relate to documenting synchronous multimedia collaboration sessions in connection with a group-based communication system.

Traditionally, non-in-person collaboration has been divided into asynchronous communication (such as emails and group-based messaging), where a recipient may view a message minutes, days, or months after the sender sends it, and synchronous communication (such as phone calls and video meetings) which occur in real time but must be scheduled in advance. None of these formats can replicate the kind of serendipitous conversations that happen naturally during live, face-to-face meetings. To replicate live meetings, certain synchronous multimedia collaboration sessions may be joined by synchronous multimedia collaboration session participants, who interact with each other in real time, typically via live audio, during which participants engage in dialogue. However, in some situations, non-participants in the synchronous multimedia collaboration session may need to access the subject matter of the synchronous multimedia collaboration session or otherwise contribute to the dialogue in real time or near real time. As such, what is needed is a synchronous multimedia collaboration platform that documents the multimedia content, for example with associated topical transcriptions of speech occurring in a particular synchronous multimedia collaboration session.

SUMMARY

Embodiments of the invention address the above-identified need by providing mechanisms for documenting a synchronous multimedia collaboration session in connection with a group-based communication system, the method comprising: detect a live synchronous multimedia collaboration session, in response to detecting the live synchronous multimedia collaboration session, receiving a first audio segment during a first time period of the live synchronous multimedia collaboration session, transcribing the first audio segment into a first transcribed text segment, generating a collaboration thread associated with the synchronous multimedia collaboration session, posting, during the live synchronous multimedia collaboration session, a first message based on the first transcribed text segment to a collaboration thread associated with the synchronous multimedia collaboration session, receiving a second audio segment during a second time period of the live synchronous multimedia collaboration session, transcribing the second audio segment into a second transcribed text segment, and posting, during the live synchronous multimedia collaboration session, a second message based on the second transcribed text segment to the collaboration thread associated with the synchronous multimedia collaboration session in the group-based communication system.

In a second embodiment, the invention includes a method of documenting a synchronous multimedia collaboration session in connection with a group-based communication system, the method comprising: detect a live synchronous multimedia collaboration session, in response to detecting the live synchronous multimedia collaboration session, receiving a first audio segment during a first time period of the live synchronous multimedia collaboration session, transcribing the first audio segment into a first transcribed text segment, generating a collaboration thread associated with the synchronous multimedia collaboration session, posting, during the live synchronous multimedia collaboration session, a first message based on the first transcribed text segment to a collaboration thread associated with the synchronous multimedia collaboration session, receiving a second audio segment during a second time period of the live synchronous multimedia collaboration session, transcribing the second audio segment into a second transcribed text segment, and posting, during the live synchronous multimedia collaboration session, a second message based on the second transcribed text segment to the collaboration thread associated with the synchronous multimedia collaboration session in the group-based communication system.

In a third embodiment, the invention includes system comprising at least one processor and at least one non-transitory memory storing computer executable instructions that when executed by the processor cause the system to carry out actions comprising: documenting a synchronous multimedia collaboration session in connection with a group-based communication system, the method comprising: detect a live synchronous multimedia collaboration session, in response to detecting the live synchronous multimedia collaboration session, receiving a first audio segment during a first time period of the live synchronous multimedia collaboration session, transcribing the first audio segment into a first transcribed text segment, generating a collaboration thread associated with the synchronous multimedia collaboration session, posting, during the live synchronous multimedia collaboration session, a first message based on the first transcribed text segment to a collaboration thread associated with the synchronous multimedia collaboration session, receiving a second audio segment during a second time period of the live synchronous multimedia collaboration session, transcribing the second audio segment into a second transcribed text segment, and posting, during the live synchronous multimedia collaboration session, a second message based on the second transcribed text segment to the collaboration thread associated with the synchronous multimedia collaboration session in the group-based communication system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
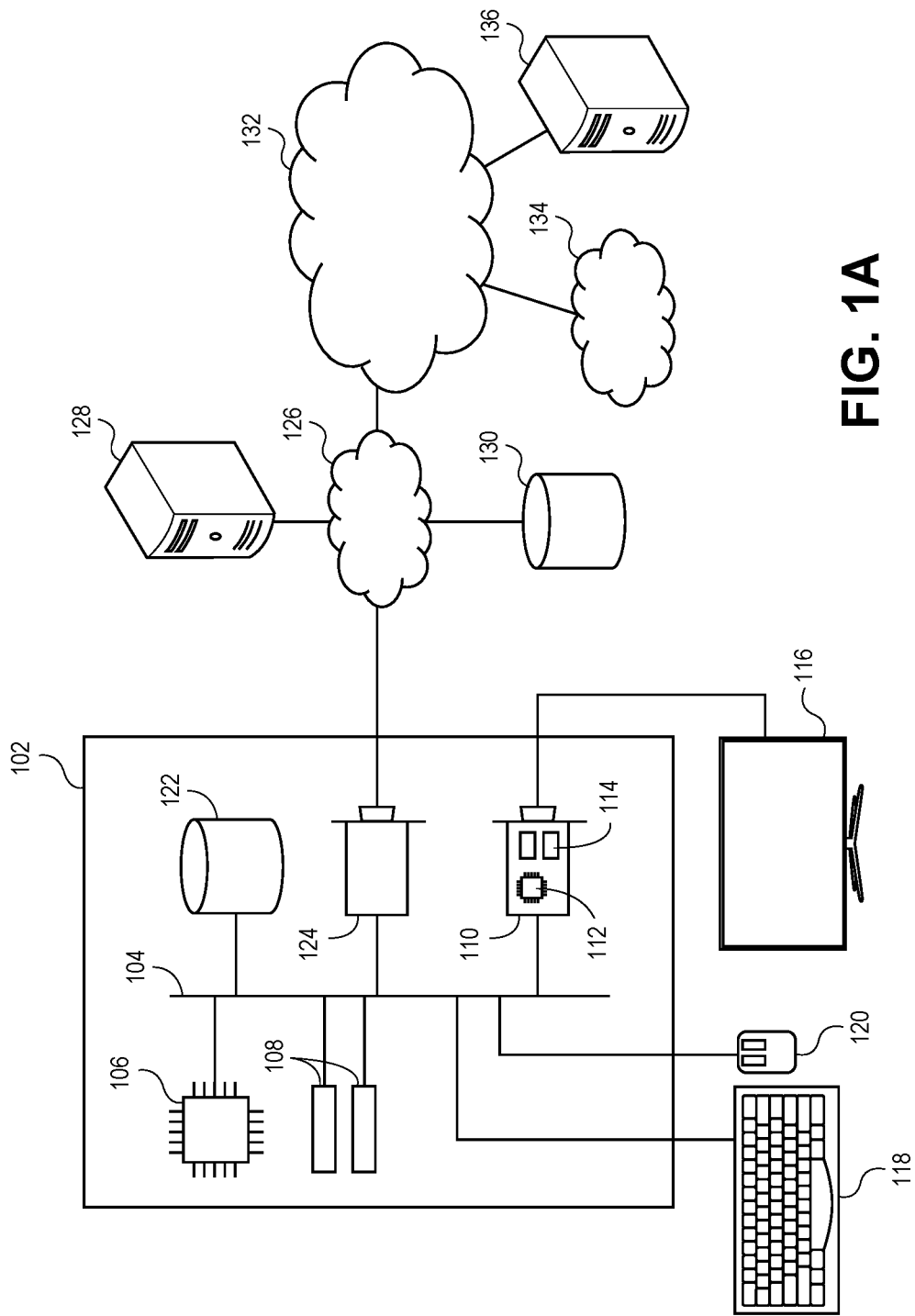
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email or SMS messaging system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

In various embodiments, group-based communication systems utilize message metadata to generate work graphs that capture relationships between users, between users and channels, between users and topics, between channels and topics, between channels, between topics, and/or the like. Work graph data may be used as machine learning (ML) structure inputs for training and/or utilizing ML structures (e.g., logistic regressions, neural networks, etc.). Various exemplary group-based communication systems may utilize message metadata and/or ML structures to rank messages, people, channels, and/or the like for a variety of applications. For example, such applications may include determining relevant messages, conversations, files, people (e.g., experts who can answer a question), channels (e.g., where a question may be answered), and/or the like in response to a user's search query; generating a recap of a channel; ranking the most important messages to read across every channel; suggesting channels to join, leave, favorite, and/or the like. Work graph metadata may be used to identify topics of interest to particular group-based communication system users or to provide recommendations regarding which users frequently work together or work on similar topics.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 124 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
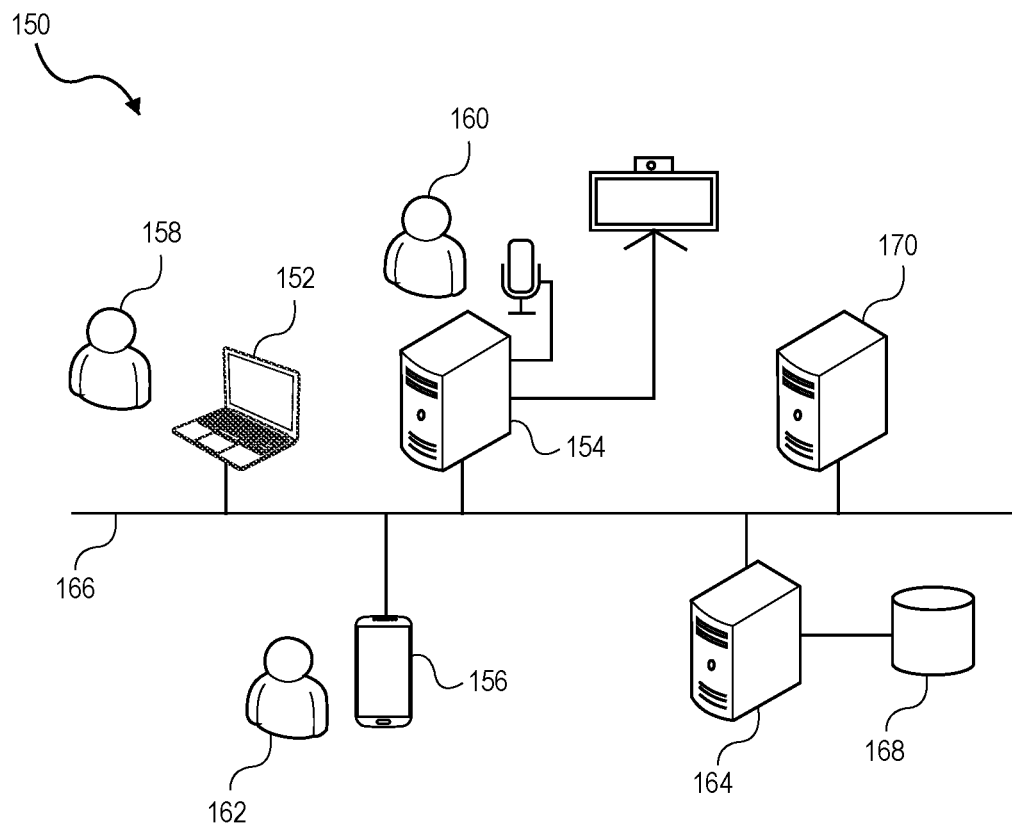
FIG. 1B illustrates elements of a system for carrying out embodiments of the invention.

FIG. 1B illustrates elements of a system 150 for carrying out embodiments of the invention. referred to generally by reference numeral 150. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, when synchronous multimedia collaboration sessions are archived (as described in greater detail below), the archived synchronous multimedia collaboration session data is stored on group-based communication system data store for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time synchronous multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server is via network 166. In some embodiments, however, the real-time nature of synchronous multimedia collaboration sessions may be better served by connecting via a different network for part or all of the communicative coupling. For example, a particular client device may normally connect to group-based communication system server 164 via a cellular data connection but switch to a WiFi connection when a synchronous multimedia collaboration session begins to accommodate an additional demand for bandwidth. In some embodiments, client devices may communicate synchronous multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Operational of Embodiments of the Invention

Figure 2A:
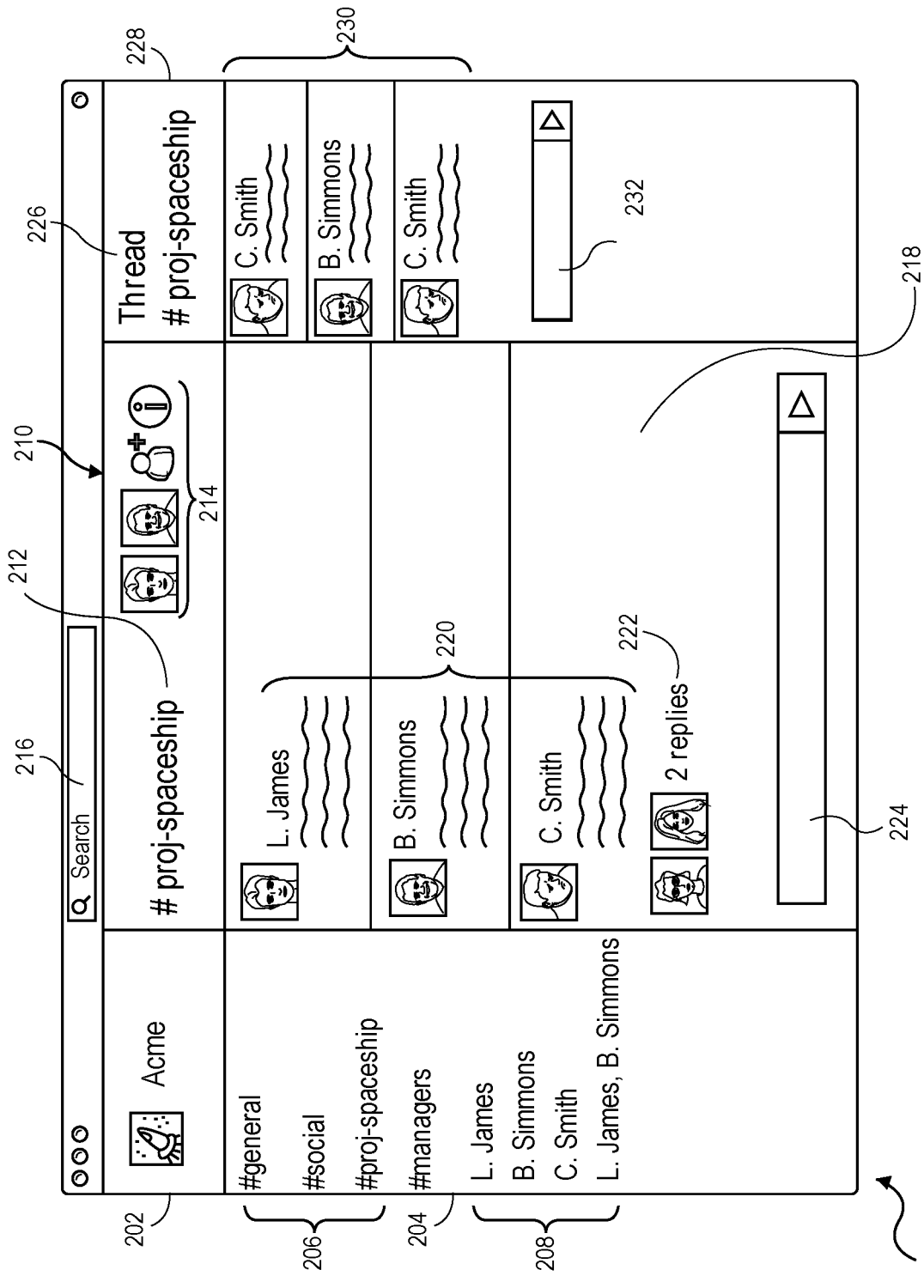
FIG. 2A depicts a representative user interface of a group-based communication system with threaded messages.

FIG. 2A depicts a representative user interface of a group-based communication system, which will be useful in illustrating the operation of various embodiments of the inventions, as discussed in further detail below. Broadly speaking, user interface 200 comprises a plurality of objects such as panes, text entry fields, buttons, messages, or other user interface components. As depicted, user interface 200 comprises workspace pane 202; channel list pane 204, which comprises channel list 206 and direct message list 208; channel pane 210, which comprises channel header 212, channel controls 214, channel display 218, messages 220, and thread reply preview 222; search pane 216; compose pane 224; and thread pane 226, which comprises thread header 228, collaboration thread 230, and thread compose pane 232. In some embodiments, users can interact with these panes and other objects to navigate and utilize the various functions available within the group-based communication system.

As depicted, user interface 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Development Company. The user may also be a member of a local volunteer organization that also uses the group-based communication system to collaborate. To navigate between the two groups, the user may use workspace pane 202 to change from the Acme Software Development Company workspace to the volunteer organization workspace. A workspace may comprise one or more channels that are unique to that workspace and/or one or more channels that are shared between one or more workspaces. For example, the Acme Software Development Company may have a workspace for Acme Software Development Company software development projects, a workspace for Human Resources, and an additional workspace for general company matters. In some embodiments, workspaces can be associated with one or more organizations or other entities associated with the group-based communication system.

As depicted, user interface 200 further comprises channel pane 210 that displays information related to the currently displayed channel. In some embodiments, within the group-based communication system, communication may be organized into "channels," each channel dedicated to a particular topic or set of users. Members of a particular channel can post messages within that channel that are visible to other members of that channel together with other messages in that channel. In some embodiments, or for certain selected channels, messages may be visible only to channel members; in other embodiments or for other channels, non-members of a channel may be able to preview messages in a channel without joining. Users may select a channel for viewing in order to see only those messages relevant to the topic of that channel without seeing messages posted in other channels on different topics. Channel pane 210 may comprise channel header 212, channel controls 214, channel display 218, and compose pane 224. Scrollable channel display 218 may display all of the content transmitted via the channel including, but not limited to, messages 220 and thread reply previews 222. Users may navigate between channels using channel list pane 204. For example, the user may click on a desired channel using a pointing device in order to cause that channel to be displayed in channel pane 210. Channel list pane 204 may comprise a list of channels to which the user has subscribed to or to which the user has been granted access.

In some embodiments, channel list pane 204 further includes direct message list 208. Direct message list 208 comprises a list of messages sent from a user directly to another user of the group-based communication system, which may be displayed in channel pane 210 when selected. Direct messages may be sent to one other user or more than one other user. For example, the user may have a question for their manager, so the user may send a direct message to the manager asking the question. The manager may want to include another member of the group-based communication system in a response, so the manager may create a direct message group that includes the user and the other member of the group-based communication system. Direct messages may be sent to any number of users.

In some embodiments, conversations in channels may further be broken out into threads. Threads may be used to avoid cluttering a channel with conversation unrelated to the main channel topic. For example, a user, C. Smith, in the channel #proj-spaceship may ask a question pertaining to a specific test that needs to be conducted. Another member of the channel may decide to reply to the user in a thread to keep the conversation grouped together and to keep the response from getting lost in the channel. Under the message to which a user has replied appears thread reply preview 222. Thread reply preview 222 may show information related to the thread, such as, for example, the number of replies and the members who have replied. Thread replies may appear in thread pane 226 that may be separate from channel display 218 in channel pane 210 and may be viewed by other members of the channel by selecting thread reply preview 222 in channel display 218.

In some embodiments, thread pane 226 includes thread header 228 that may display the channel the thread is associated with. Thread pane 226 also may include collaboration thread 230, which may be scrollable, and that displays each message sent in the history of the thread. Users participating in the thread may also reply directly to the thread using thread compose pane 232. Thread compose pane 232 may be positioned within thread pane 226 where a user can compose and transmit a reply to the messages in the thread. In some embodiments thread header 228 contains a discussion topic associated with the thread. In some embodiments the discussion topic may be updated by a thread participant. In some other embodiments, the discussion topic is programmatically determined based on semantic content of the thread.

Channel pane 210 may also include channel header 212, which may display metadata for the currently selected channel, including channel name, channel membership, and channel topic. Channel header 212 may also display channel controls 214 for viewing members of the channel, inviting a new member to the channel, viewing information about the channel, or other channel-related functions. In embodiments of the group-based communication system that include synchronous multimedia collaboration sessions, channel header 228 may also include additional or different channel controls 214 for starting or controlling a synchronous multimedia collaboration session.

User interface 200 may also include search pane 216. Search pane 216 may allow users to search for content located in the current workspace of the group-based communication system. For example, a user may be looking for a file that was sent in a channel previously. The user may not remember which channel the file was sent in or when the file was sent, so the user may search for the file name in search pane 216. Users are not limited to searching for only files and may also search for messages, channels, members, and the like.

As previously mentioned, channel pane 210 may also include compose pane 224. Compose pane 224 allows users to compose and transmit messages to the members of the channel. Compose pane 224 may have text editing functions such as bold, strikethrough, and italicize. Compose pane 224 may also allow users to format their messages or attach files such as, but not limited to, document files, images, videos, or any other files to share the file or files with other members of the channel. In some embodiments, controls 214 for starting the synchronous multimedia collaboration session may be located elsewhere (such as within synchronous multimedia collaboration session pane 252, discussed below with respect to FIG. 2B). In some embodiments, controls 214 can be used to select a sidebar pane (such as synchronous multimedia collaboration session pane 252 or thread pane 226). In some embodiments, the controls display additional information when the user hovers over them. For example, the "synchronous multimedia collaboration session" control 214 might display a list of members in an ongoing synchronous multimedia collaboration session if the user hovers over it, even when synchronous multimedia collaboration session pane 252 is not displayed.

Figure 2B:
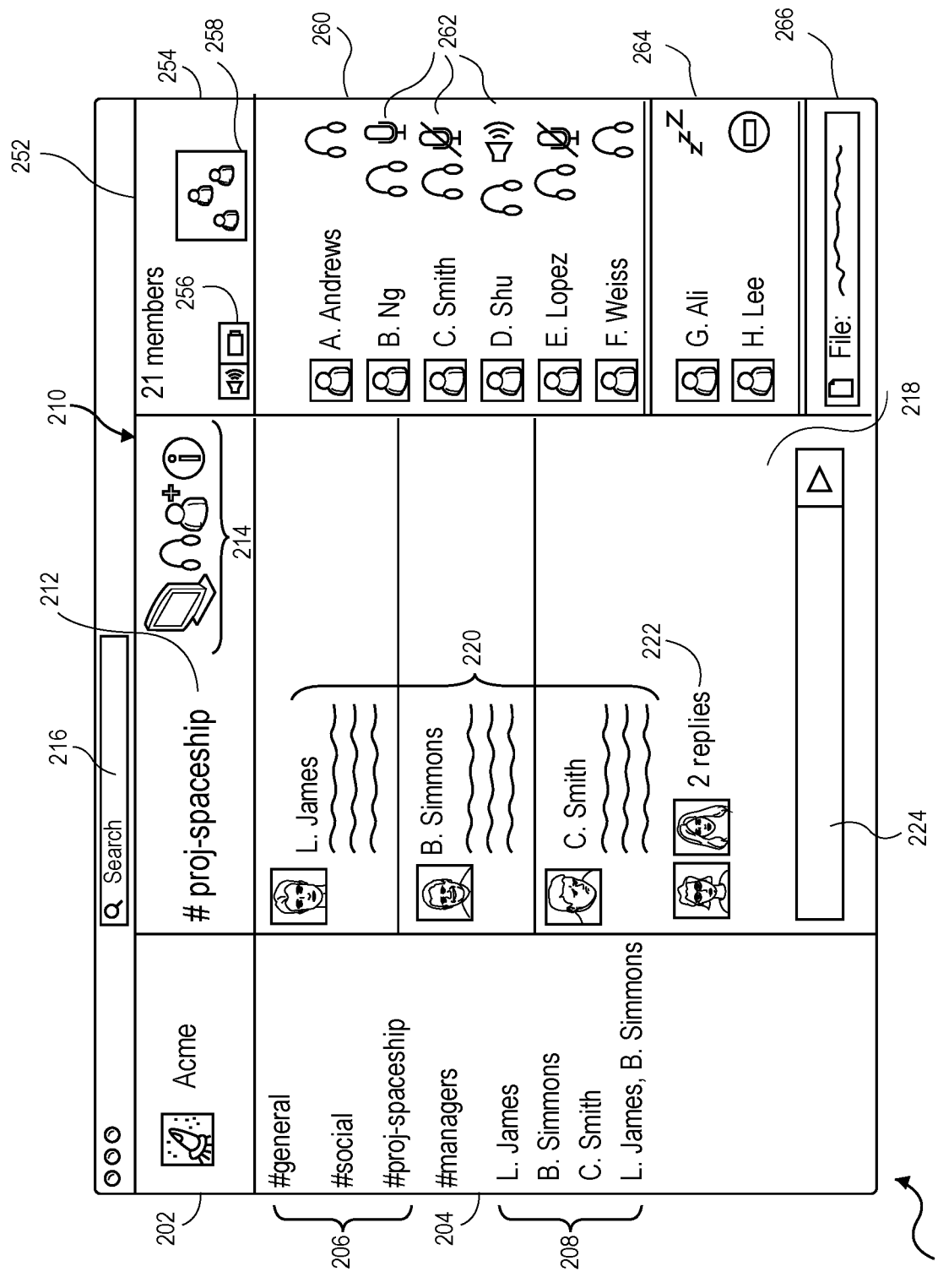
FIG. 2B depicts a representative user interface of a group-based communication system hosting a synchronous multimedia collaboration session.

FIG. 2B depicts a representative user interface 250 of a group-based communication system hosting a synchronous multimedia collaboration session. User interface 250 depicts a channel in a group-based communication system for asynchronous collaboration among a group of users (also known as members of the channel). Users of the group-based communication system can post messages at any point in time, and other members can view them at their leisure, either in real time or when they next visit the particular channel of the group-based communication system. This has the advantage that users can focus on particular tasks without being distracted by the need to constantly monitor real-time communications. In such systems, the addition of synchronous multimedia collaboration sessions can help improve team integration and collaboration. For example, a regularly scheduled, real-time sync session can help team members better understand what their coworkers are working on.

However, formally organized and structured meetings are a poor vehicle for collaboration. Users feel pressured to set aside time for the meeting, prepare for it, and devote their entire attention to the predetermined meeting topic. By contrast, embodiments of the invention allow users to collaborate ambiently, as if they were working together in the same room, but without the need for physical proximity. Integrating such ambient collaboration into the group-based communication system further has the benefits of reducing the barrier to initiating a synchronous multimedia collaboration session. Rather than being required to propose a meeting, confirm availability, choose a time, and send invitations, a user can simply start a synchronous multimedia collaboration session with members of the channel, a direct message or multi person direct message with a single button press. Channel members or members of a conversation in a direct message who are available can join the synchronous multimedia collaboration session, join in listen-only mode, or decline to join. In some embodiments, members may join and leave the synchronous multimedia collaboration session at any point in time the session is active. In some embodiments, users who are not members of the channel may join the synchronous multimedia collaboration session. In some embodiments, the group-based communication system may provide recommendations to users of synchronous multimedia collaboration sessions that are currently active based on a user's interest, projects the user is associated with, or other context associated with the user through conversations, recent interactions with other users who are joined in the live synchronous multimedia collaboration session, or channels that the user is part of. In some embodiments, topics may be surfaced to non-participants 264 in a virtual multimedia collaboration content hub. The virtual multimedia collaboration content hub may be presented in channel display 218 of user interface 200 and may display a list of recommended synchronous multimedia collaboration sessions as well as other content relevant to the user. Notification to a user of a recommended synchronous multimedia collaboration session may take the additionally form of a pop-up notification or other user interface affordance that recommends active synchronous multimedia collaboration sessions that may be of interest to the user as determined by the group-based communication system, for example by reference to work graph metadata. Moreover, in various embodiments, once a synchronous multimedia collaboration session is established, transcription of speech segments associated with a corresponding session dialogue may be interspersed into a thread such as collaboration thread 230 as shown in FIG. 2A, as discussed in additional detail below with respect to FIGS. 3A and 3B.

As depicted, synchronous multimedia collaboration session pane 252 is illustrated, as it might be if a user had selected the "synchronous multimedia collaboration session" control 214. Controls 214 may include useful information that may be updated in real time. For example, the icon itself might change to reflect a type of multimedia in a given synchronous multimedia collaboration session. For example, if the multimedia type for the synchronous multimedia collaboration session changes from audio-only to audio/video, the headphones icon might change to a camera icon. Similarly, a projector screen icon might be shown for a screen share session, or a file icon might be shown for a file sharing session. Synchronous multimedia collaboration session pane 252 includes a synchronous multimedia collaboration session control header 254 with controls for controlling the synchronous multimedia collaboration session. For example, as depicted, synchronous multimedia collaboration session control header 254 includes a multimedia type control 256 and a begin synchronous multimedia collaboration session control 258. In some embodiments, the multimedia type control 256 allows users to select or change a particular type of synchronous multimedia collaboration session. For example, a user might be able to select from audio-only, audio/video, screen share, scratch pad/whiteboard, file share, or any other type of synchronous multimedia collaboration session. In some embodiments, a "talking heads" synchronous multimedia collaboration session is available including audio and a small, headshot-only video, image, or animation for the speaker. In some embodiments, non-speaking participants may be represented with just the user's profile icon. In some embodiments, non-speaking participants may be represented by just their names or initials.

In some embodiments, once a synchronous multimedia collaboration session has started, a user can use multimedia type control 256 to change to a different type of synchronous multimedia collaboration session without interrupting the ongoing synchronous multimedia collaboration session. For example, a user may upgrade the synchronous multimedia collaboration session from audio-only to audio/video (or audio/screen share) or downgrade the synchronous multimedia collaboration session from audio/video to audio-only. In other embodiments, users can only upgrade ongoing synchronous multimedia collaboration sessions to add additional media stream types. In some embodiments, a recording control may further be provided for the entire synchronous multimedia collaboration session or an individual media stream of the multimedia stream to toggle recording of a portion or all of the synchronous multimedia collaboration session.

In some embodiments, begin synchronous multimedia collaboration session control 258 allows any user to begin a synchronous multimedia collaboration session if one is not already in progress. In other embodiments, only selected users (for example, managers or channel administrators) can start synchronous multimedia collaboration sessions. In some embodiments, only group-based communication system users with the appropriate permissions may start a synchronous multimedia collaboration session. In some embodiments, only members of the channel or members of a first organization of a multi-organization channel can start a synchronous multimedia collaboration session. In some embodiments, members of a direct message or a multi person direct message may start a synchronous multimedia collaboration session. In some embodiments, anyone in the organization, workspace, channel, or a direct message can join the synchronous multimedia collaboration session. In some embodiments, only channel members of a first organization can join the synchronous multimedia collaboration session. In some embodiments, non-channel members who have the appropriate permissions (e.g., users who belong to the same organization or same workspace) may join the synchronous multimedia collaboration session. In some embodiments, only members of a first organization in a direct message conversation including users from multiple organizations may initiate a synchronous multimedia collaboration session. In some embodiments, start synchronous multimedia collaboration session control 258 ends a multimedia session if it is actuated during an ongoing synchronous multimedia collaboration session. For example, if a user in a synchronous multimedia collaboration session actuates the control, the session may be ended, or the user might leave the synchronous multimedia collaboration session without ending the synchronous multimedia collaboration session for the other participants. In some embodiments, if there is an ongoing synchronous multimedia collaboration session which the user has not joined, start synchronous multimedia collaboration session control 258 may add the user to that synchronous multimedia collaboration session upon actuation. In some embodiments, start synchronous multimedia collaboration session control 258 changes appearance based on whether there is an ongoing synchronous multimedia collaboration session and whether the user is currently joined to that synchronous multimedia collaboration session. The user may join or leave the synchronous multimedia collaboration session as many times the user wants as long as the synchronous multimedia collaboration session is live. In some embodiments, the user who initiated a synchronous multimedia collaboration session may be the owner of that synchronous multimedia collaboration session. If the user who is the owner of the synchronous multimedia collaboration session leaves the synchronous multimedia collaboration session, ownership of the synchronous multimedia collaboration session may be transferred to another user. In some embodiments, the synchronous multimedia collaboration session remains live as long as one or more users remain joined to the synchronous multimedia collaboration session.

In some embodiments, a synchronous multimedia collaboration session is tied to a channel, a direct message, a multi person direct message, or a workspace such that any active user (e.g., a user currently viewing the channel) is joined to the multimedia collaboration session. For example, if a user in a particular channel starts a multimedia collaboration session, all users currently viewing the channel may be added to the synchronous multimedia collaboration session. In some embodiments, they are added to the session in receive-only mode (for example, muted and with the camera off) to preserve privacy. In some embodiments, active users are invited to join a synchronous multimedia collaboration session but are not automatically joined to the synchronous multimedia collaboration session. In some embodiments, a user may join a synchronous multimedia collaboration session and switch to a different location in a group-based communication system while staying active in the joined synchronous multimedia collaboration session. In some embodiments, once a user leaves a channel, direct message, or workspace associated with a multimedia collaboration session, the user is disconnected from the multimedia collaboration session.

In some embodiments, users may be able to pre-configure auto-join preferences determining whether (and in what capacity) they are automatically joined to synchronous multimedia collaboration sessions on entering a channel or on session initiation. For example, a first user might specify that they wish to automatically join all synchronous multimedia collaboration sessions, a second user might specify that they wish to join newly created synchronous multimedia collaboration sessions in receive-only mode, a third user might specify that they never wish to automatically join synchronous multimedia collaboration sessions, and a fourth user might specify that they wish to join newly-created synchronous multimedia collaboration sessions in receive-only mode and join synchronous multimedia collaboration sessions in send/receive mode upon channel (or direct message or workspace) switching only if they were in a synchronous multimedia collaboration session in the previous channel prior to switching. In some embodiments, the permissions for users determine how they initiate and/or join synchronous multimedia collaboration sessions. In some embodiments, these permissions are set up by an administrator of the organization. A person of ordinary skill in the art, upon reviewing this disclosure, will appreciate that many other configurations for automatically joining synchronous multimedia collaboration sessions are possible as well, and all such configurations are contemplated as being within the scope of the invention.

In some embodiments, if a participating user leaves the first channel, direct message, or multi-party direct message (for example, by selecting a second channel in channel list 206), they may remain connected to the synchronous multimedia collaboration session associated with the first channel, direct message, or multi-party direct message and provided an opportunity to be joined to any ongoing synchronous multimedia collaboration session in the second channel. Similarly, if a user begins viewing a channel (by selecting that channel or logging on to the group-based communication system) they may be automatically joined to an in-progress synchronous multimedia collaboration session if one exists. Alternatively, a user who views a channel, direct message, or multi-party direct message may automatically be joined to an ongoing multimedia collaboration session. In some embodiments, only one synchronous multimedia collaboration session may be enabled for a given channel at one time. In some embodiments, multiple synchronous multimedia collaboration sessions may be simultaneously live in the same channel. In some embodiments, a user may switch between multiple synchronous multimedia collaboration sessions without being disconnected from any of the joined synchronous multimedia collaboration sessions.

In some embodiments, synchronous multimedia collaboration session pane 252 further displays participant list 260. Participant list 260 may display the members of the channel and their current participation status. For example, when no synchronous multimedia collaboration session is in progress, one or more status icons 262 may be displayed for each user indicating presence (for example, whether the user is active, idle, logged off, or busy). When a synchronous multimedia collaboration session is in progress, participant list 260 may be subdivided into joined users and un-joined users in non-participating user list 264. For joined users in participant list 260 during a synchronous multimedia collaboration session, status icons 262 may be changed to indicate the capacity (e.g., muted/unmuted or video on/off) in which the associated user has joined the call. In some embodiments, a summary indicating the number of joined users may be displayed in the synchronous multimedia collaboration session pane. In some embodiments, the synchronous multimedia collaboration session pane may further display a topic for the synchronous multimedia collaboration session. In some embodiments, synchronous multimedia collaboration session pane 252 may further include a collaboration object display 266. For example, as depicted, a file is the current collaboration object in collaboration object display 266. This allows quick access to a shared resource for collaboration. In some embodiments, collaboration object display 266 may be view-only; in other embodiments, collaboration object display 266 can be edited by a single user or by multiple users collaboratively in the synchronous multimedia collaboration session.

As depicted, user interface 250 depicts an ongoing synchronous multimedia collaboration session. In some embodiments, information may be shown in synchronous multimedia collaboration session pane 252 summarizing the discussion of the synchronous multimedia collaboration session. For example, a topic for the synchronous multimedia collaboration session (either specified by a user or automatically determined using semantic analysis) can be displayed. This information may be updated in real time. As depicted, some users have joined the audio collaboration session in send-receive mode (as indicated by the headphones and microphone icon), some users have joined the audio collaboration session in send-receive mode but are muted (as indicated by the headphones and the struck-through microphone) and some users have joined the synchronous multimedia collaboration session in receive-only mode as indicated by the headphones icon with no microphone icon. Additional icons may indicate who is currently speaking (as depicted, the speaker icon). A person of skill in the art, reviewing this disclosure, will appreciate that other icons can be used for other types of synchronous multimedia collaboration session and participation (for example, a camera icon for users participating in a video collaboration session or a display icon for users in a screen-sharing collaboration session). A person of skill in the art will further appreciate that these icons can be combined to represent the various media streams in a synchronous multimedia collaboration session. For example, one user might be sharing video while other users collaborate on a whiteboard and a third user speaks. Non-joined users may display an icon indicating a reason why they are not joined (for example, if they are away from their computer or busy in a meeting). In some embodiments, a nudge control (not displayed) may be present for non-joined users to allow a joined user to request that the non-joined user join the synchronous multimedia collaboration session. In some embodiments, in response to a joined user activating the nudge control, the non-joined, nudged user may be joined to the synchronous multimedia collaboration session without the non-joined, nudged user having to take affirmative action to join the synchronous multimedia collaboration session. In some embodiments, the non-joined user may receive a notification notifying the non-joined user that they have been invited to join the synchronous multimedia collaboration session. In some embodiments, the notification may include a button to join the non-joined user to join or decline the synchronous multimedia collaboration session.

In some embodiments, users may react to the speaker by selecting an emoji to react to the speaker in real time. In some embodiments, the selected emojis are displayed next to the speaker's icon or the reacting user's icon. In some embodiments, the selected emojis are ephemeral and disappear once displayed in synchronous multimedia collaboration session pane 252 for a predetermined period of time. In some embodiments, the selected emoji is displayed next to the appropriate user's icon. In some embodiments, the emoji may be displayed instead or in addition in proximity to a transcribed segment of multimedia content such as thread message 332 (discussed below) that is temporally associated with the user's reaction. In some embodiments, thread message 332 includes emojis that have been selected with a count representing the number of times each emoji has been selected.

Figure 3A:
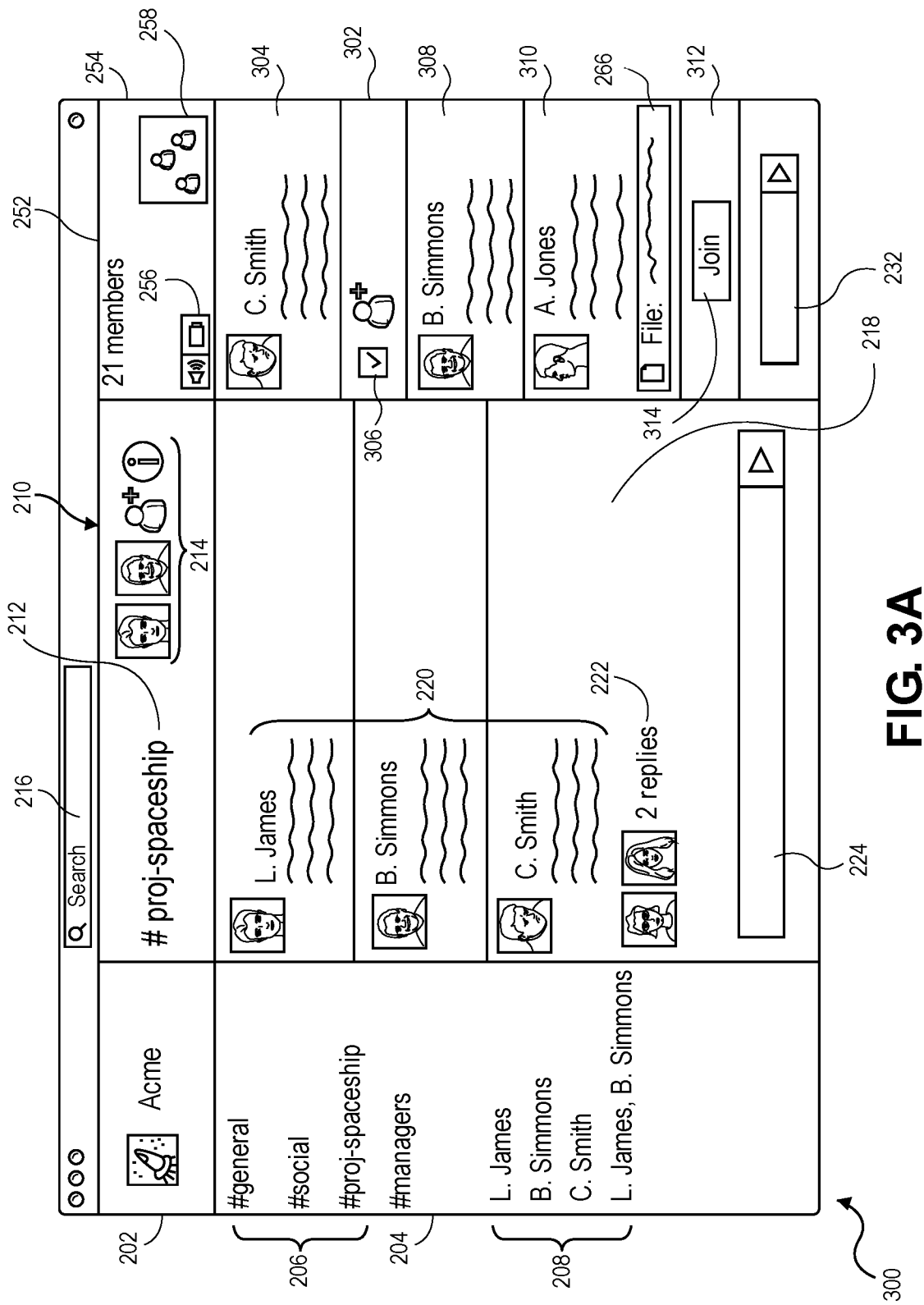
FIG. 3A depicts a user interface illustrating a first use case of one embodiment of the invention.

FIG. 3A depicts a user interface 300 illustrating a first use case of one embodiment of the invention, where live transcriptions of audio are displayed in the corresponding thread associated with the synchronous multimedia collaboration session. Certain elements of FIG. 3A are described above in connection with FIGS. 2A and 2B, and those descriptions are not repeated here. As described in connection with FIG. 2B above, a user interface in accordance with embodiments of the invention can display synchronous multimedia collaboration session pane 252. In some embodiments, however, instead of participant list 260 (and, optionally, non-participating user list 264 and/or collaboration object display 266).

In this embodiment, C. Smith, a member the channel #proj-spaceship is a participant in a synchronous multimedia collaboration session and has spoken an audio segment during the synchronous multimedia collaboration session. The spoken audio segment has been transcribed in real time (or near real time) into a text segment that has been posted as thread message 304. In this example, thread message 304 has been posted to a collaboration thread 302 as shown in user interface 300. Another group-based communication system user having access to the channel may decide to react to the message for example with a "check mark" icon as shown in thread reaction 306. Such a reaction may be provided in real time so that a real-time speaking participant in the synchronous multimedia collaboration session may observe the reaction and comment on it in real time. Similarly, such a reaction could be provided asynchronously, for example, even several days after the fact. In this situation the speaker may return to the thread 302 and provide commentary to the reaction or otherwise comment on the reaction. In some embodiments, any member of a synchronous multimedia collaboration session may access an affordance associated with the synchronous multimedia collaboration session to place the session into ephemeral mode, thereby taking the synchronous multimedia collaboration session "off the record." In alternative embodiments, only a leader of the synchronous multimedia collaboration session or system administrator may toggle an ephemeral mode. In some such embodiments, a prominent indicator is displayed for all participants to indicate whether the synchronous multimedia collaboration session is being recorded and/or transcribed or whether the discussion is "off the record." In some embodiments, an administrator of the group-based communication system may manage permissions for individual group-based communication system users regarding when the users may access transcripts, summaries, digests, audio segments, and screenshots associated with synchronous multimedia collaboration sessions as well as whether a particular user may put the session into ephemeral mode. In some embodiments, the summary may be broken down into component summaries that summarize what a particular participant said about a particular subtopic.

Additional audio segments may be similarly transcribed. In this example, thread message 308 is posted to thread 302 after thread message 304. Although thread message 308 is depicted as being from a second participant (B. Simmons) in the synchronous multimedia collaboration session distinct from the first participant (C. Smith), sequential thread messages 304 and 308 may be from the same user. In some embodiments, for example, any pause of a predetermined length (for example, over one second) may cause text audio before and after the pause to be posted as separate messages. The second audio segment may be received subsequent to reception of the first audio segment or at substantially the same time as the first audio segment. For example, audio received from different participants speaking at the same time may be transcribed and posted as separate messages, to allow other participants to understand both speakers even in the face of crosstalk. In real time and during the synchronous multimedia collaboration session, the message is then posted to the collaboration thread 302 associated with the synchronous multimedia collaboration session. Messages may be posted in broadly sequential order in thread 302.

In some embodiments, during the synchronous multimedia collaboration session, textual input is received (for example, via thread compose pane 232) from a first non-participant in the synchronous multimedia collaboration session, such as a user who is following the synchronous multimedia collaboration session by reading the thread in real time. Thread message 338, based on the textual input from the non-participant (A. Jones), can be posted in the thread together with the transcribed audio segments in real time and during the synchronous multimedia collaboration session, is posted to the collaboration thread 302. This capability allows users who cannot listen to the synchronous multimedia collaboration session to contribute to the discussion.

In some embodiments, one or more transcribed thread messages may be designated as action items or items to be placed on a certain to-do list. In these embodiments, a collaboration session leader may designate a single list of action items for a particular synchronous multimedia collaboration session or specify lists for individual participants or groups of participants. In these embodiments, a list of action items can be maintained and either appended to the collaboration thread 302 or otherwise sent as a direct message or a message or attachment to a group-based communication system channel.

In some embodiments, a request to join the synchronous multimedia collaboration session may be received from a group-based communication system user that is a non-participant in the synchronous multimedia collaboration session. In these embodiments, the second non-participant may be thereafter joined as a participant in the synchronous multimedia collaboration session. In some embodiments, the request to join the synchronous multimedia collaboration session is received in connection with a joining affordance presented to the non-participant. Such a joining affordance may take the form of a user interface control, such as button 314 that is placed below the most recent thread message (as depicted, thread message 310) in control area 340, within the collaboration thread. Such an affordance allows a user who is following along by reading the thread to quickly jump into the synchronous multimedia collaboration session, even if they are currently navigating a different channel in channel list 206, for example.

Figure 3B:
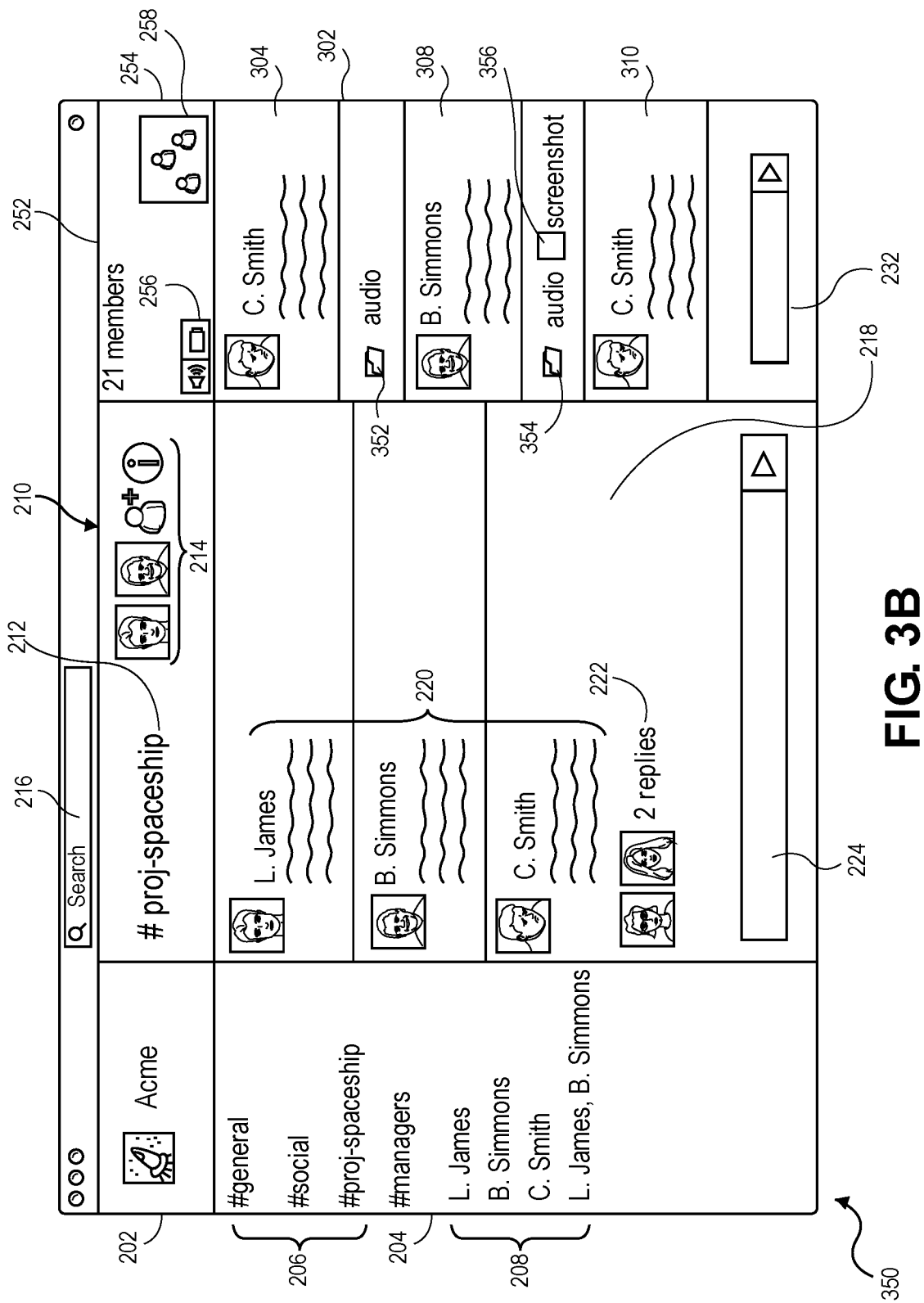
FIG. 3B depicts a user interface illustrating a second use case of one embodiment of the invention.

FIG. 3B depicts a user interface 350 illustrating a second use case of one embodiment of the invention. In this embodiment, C. Smith, a member the channel #proj-spaceship, is a participant in a synchronous multimedia collaboration session and has spoken an audio segment during the synchronous multimedia collaboration session. The spoken audio segment has been transcribed in real time (or near real time) into a text segment that has been posted as thread message 304 as described above with respect to FIG. 3B. In this example, thread message 304 has been posted to a collaboration thread 302 as described above with respect to FIG. 3A.

In some embodiments, based on configuration of the synchronous multimedia collaboration session, in addition to posting a transcribed text segment corresponding to a spoken audio segment, audio segment attachment 352 is attached to the thread message. In some embodiments, the attachment is an audio file having a compressed file format (such as MP3) or uncompressed audio file format (such as WAV). In other embodiments, audio segment attachment 352 may be a link to an audio file or other data stream capable of being rendered as audio. In some embodiments, a user may click or tap on audio attachment 352 to play corresponding audio. In some other embodiments an additional audio playback button or link may be provided. This allows a later listener to hear the original audio to better understand the emotional content of the message or to better understand the message in the event of transcription errors or ambiguities.

As depicted, thread message 308 may be from a second participant (B. Simmons) in the synchronous multimedia collaboration session. Thread message 308 may correspond to dialog spoken in the synchronous multimedia collaboration session or it may be input as text directly into the collaboration thread, either in real time or after the fact. If the text input is provided after the fact, the providing user may be able to specify a time or point in the thread for the message to be posted. If thread message 308 is transcribed from speech in the synchronous multimedia collaboration session, it may bear audio attachment 354, as described above with respect to thread message 304. Alternatively, if thread message 304 is input as text, thread message 304 may be converted from text to speech into corresponding audio attachment 354. In some such embodiments, once audio attachment 354 is converted from text into speech, the synchronous multimedia collaboration session may replay audio attachment 354 into the first available audio silence in the synchronous multimedia collaboration session. In some embodiments, image attachment 356 corresponds to a screenshot based on a shared screen that was being shared during the synchronous multimedia collaboration session at the time that thread message 386 was posted. Alternatively, image attachment 356 may be a video showing some or all of the video content of the multimedia collaboration session corresponding to the transcribed text. Finally, a follow-up message 310 may be posted to the thread responding to comments or reactions, and this message may be posted either in real time during the synchronous multimedia collaboration session or at any later date.

Figure 4:
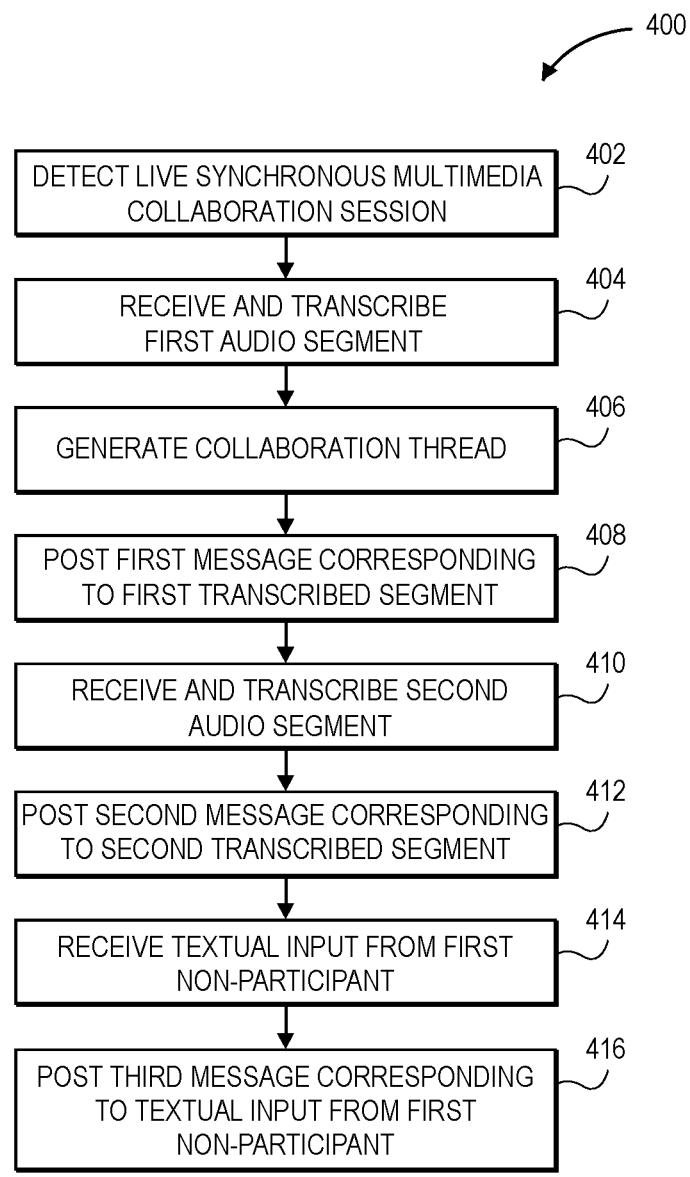
FIG. 4 depicts a flowchart illustrating the operation of a method in accordance with embodiments of the invention.

FIG. 4 depicts a flowchart illustrating the operation of a method 400 of documenting a synchronous multimedia collaboration session in accordance with embodiments of the invention. In some embodiments, method 400 enables a method of documenting synchronous multimedia collaboration sessions in connection with a group-based communication system. At step 402, a live synchronous multimedia collaboration session is detected. As described in connection with FIG. 2B, above, synchronous multimedia collaboration sessions may be established (or taken live) among group-based communication system users such that group-based communication system users may elect to become participants in one or more of the synchronous multimedia collaboration sessions. In some embodiments, a group-based communication system user may join a synchronous multimedia collaboration session from a channel, a direct message (including a multi person direct message), or a workspace. In alternative embodiments, the group-based communication system user may join a synchronous multimedia collaboration session from an arbitrary user interface affordance associated generally with a group-based communication system interface.

At step 404, the first audio segment is received and transcribed into a first transcribed text segment. In some embodiments, this transcription is facilitated by way of natural language processing based on subject matter identified with an associated topic that is specified by one or more participants in the synchronous multimedia collaboration session. Because each participant in the synchronous multimedia collaboration session has individually joined based at least in part on the participant's association with one or more aspects of the group-based communication system, work-graph information regarding the participant is available to the group-based communication system to facilitate transcription of spoken dialogue from the participant.

In some embodiments, transcription may be further facilitated by eliminating crosstalk by capturing audio only from a particular user or from multiple users simultaneously. In these embodiments, a composite audio stream made up of audio from multiple speakers speaking at the same time may be substantially unintelligible, while nevertheless being separately transcribable. In this case, when the transcribed speech segments are posted to a collaboration thread associated with a group-based communication channel from which the synchronous multimedia collaboration session was established, otherwise unintelligible crosstalk can be clearly (and substantially in real time) transcribed into the collaboration thread.

In some embodiments, in addition to transcribing audio segments based on natural language processing, a group-based communication system hosting a synchronous multimedia collaboration session may aggregate the transcribed audio segments. Such an aggregation of transcribed segments may then be assimilated into a digest or summary of the conversation that is taking place or has taken place in the synchronous multimedia collaboration session. Such an aggregation may take place substantially in real time so that a prospective participant may observe a current state of a session digest in order to decide whether to join the synchronous multimedia collaboration session. In some such embodiments, a digest may be further summarized into a topic of discussion using machine learning methods to characterize the digest of communications into a particular topic within a predetermined or evolving taxonomy of potential discussion topics. In some such embodiments, a summary may be augmented with a list of all documents discussed in the session as well as a list of group-based communication system users who were mentioned in the session.

At step 406, a collaboration thread associated with the synchronous multimedia collaboration session is generated. In some embodiments, where the synchronous multimedia collaboration session is associated with a channel, the collaboration thread is generated as a first reply to a most-recent message in the channel with which the synchronous multimedia collaboration session is associated. In alternative embodiments, where the synchronous multimedia collaboration session is associated with a direct message or a multi person direct message, the collaboration thread is generated as a first reply to a most-recent message in the direct message conversation with which the synchronous multimedia collaboration session is associated. In further embodiments, where the synchronous multimedia collaboration session is associated with a workspace generally, the collaboration thread is generated in a collaboration hub associated with the workspace displaying user-relevant content such as ongoing huddles. In still further alternative embodiments, where the synchronous multimedia collaboration session is associated with a workspace generally, the collaboration thread is generated as a first reply to a most-recent message in a workspace general forum with which the synchronous multimedia collaboration session is associated. In some such embodiments, the general forum is a channel associated with the workspace entitled "#general."

At step 408, in real time (or near real time) and during the synchronous multimedia collaboration session, a first message based on the first transcribed text segment is posted to a collaboration thread associated with the synchronous multimedia collaboration session. In some embodiments, posting the first message further includes posting an associated attachment to the first message. In some such embodiments, the attachment to the first message includes a first audio segment corresponding to a segment of speech from the first participant in the synchronous multimedia collaboration session. In various embodiments, the attachment further comprises a link to one or more images or videos of screen-shares, such as documents that were being presented contemporaneously with the speech from a first participant in the synchronous multimedia collaboration session. Alternatively or in addition, the documents being shared can be themselves linked. In various embodiments, in connection with timestamps associated with when particular documents are being presented or applications are being shared, a list of documents and/or application names are persisted in connection with the synchronous multimedia collaboration session so that a list of documents presented or applications shared may be accessed either in real time or in connection with accessing an archive of the synchronous multimedia collaboration session.

As described in connection with FIG. 2B above, during the synchronous multimedia collaboration session, an audio-visual display may be provided with various video displays. In some cases, a "talking heads" window with a live display of the speaking participant may be presented. In some other cases, a shared application or document may be displayed. In some further cases, a shared white board may be displayed synchronized with the synchronous multimedia collaboration session.

At step 410, a second audio segment is received and transcribed corresponding to speech from a second participant distinct from the first participant in the synchronous multimedia collaboration session. As described above, the second audio segment may be received subsequent to reception of the first audio segment or at substantially the same time as the first audio segment. Since first and second audio channels are received separately by a group-based communication system the contents may be received, processed, and (if desired), persisted separately from each other, thereby eliminating any crosstalk problems that may otherwise be associated with reception of only a composite audio stream associated with the overall audio portion of the synchronous multimedia collaboration session.

When the second audio segment is transcribed into a second transcribed text segment, it is transcribed as a natural language transcription that may be processed based on subject matter identified with an associated topic that is specified by one or more participants in the synchronous multimedia collaboration session. The second participant's relationship to other participants in the synchronous multimedia collaboration session may facilitate transcription of spoken dialogue from the second participant. Additionally, interactions with applications or documents being displayed while the second participant is speaking may be persisted by way of time-stamped screen captures or image snapshots that are synchronized with the associated transcribed text segment so that the images may be correlated to the transcribed text segments for archival purposes or for subsequent attachment to messages posted to the collaboration thread. In some embodiments, when a user presents a document or shares an application the presenting user may be prompted to instruct the group-based communication system to insert a link to the document or application into the collaboration thread at the particular point in the session where the sharing and/or presenting begins.

At step 412, in real time and during the synchronous multimedia collaboration session, a second message based on contents of the second transcribed text segment is posted to the collaboration thread associated with the synchronous multimedia collaboration session in the group-based communication system. Posting of the second message will typically occur based on a temporal relationship to posting of the first text segment as described in connection with step 406 above. In some embodiments, semantic context of the first and second text messages may dictate that the second message be posted above the first message in the collaboration thread. This may occur, for example when the messages are received substantially simultaneously or when the second message corresponds to a repeated speech segment that corresponds to a speech segment that was originally made prior to the first speech segment. In addition to temporal or chronological posting of thread messages, messages may be ordered, prioritized, or otherwise highlighted based on programmatically determined importance to a viewing user, who is using the group-based communication system. Such prioritization may be determined by reference to a group-based communication system work graph, based on topics explicitly indicated by the user as being of interest, or by automatically determined topics of interest for the user.

At step 414, during the synchronous multimedia collaboration session, textual input is received from a first non-participant in the synchronous multimedia collaboration session. In some embodiments, during the synchronous multimedia collaboration session, a reaction is received from a third non-participant in the synchronous multimedia collaboration session. In these embodiments, in real time and during the synchronous multimedia collaboration session, a graphical representation corresponding to the reaction can be posted in the collaboration thread associated with the synchronous multimedia collaboration session in the group-based communication system.

Finally at step 416, in real time and during the synchronous multimedia collaboration session, a third message based on the textual input is posted to the collaboration thread associated with the synchronous multimedia collaboration session in the group-based communication system. In some embodiments, a request to join the synchronous multimedia collaboration session is received from a second non-participant. In these embodiments, the second non-participant may be thereafter joined to a participant in the synchronous multimedia collaboration session. In some embodiments, the request to join the synchronous multimedia collaboration session is received in connection with a joining affordance presented to the second non-participant in the collaboration thread associated with the synchronous multimedia collaboration session in the group-based communication system, such as a button that is placed below a message in the collaboration thread in which text messages are posted as messages are transcribed and posted from the synchronous multimedia collaboration session. In some embodiments, a list of participants in a synchronous multimedia collaboration system is maintained in connection with a group-based communication system. In these embodiments, a list of timestamps may also be maintained that indicate when each participant joined and left a particular synchronous multimedia collaboration system. In some such embodiments, this list of participants and associated timestamps may be integrated with a calendaring system so that either a particular user may be able to view when he or she was a participant in a particular synchronous multimedia collaboration system or an organization to which the user belongs can track a user's time spent working on particular topics.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. One or more non-transitory computer-readable media that store computer-executable instructions that, when executed by at least one processor, perform a method of documenting a synchronous multimedia collaboration session in connection with a group-based communication system, the method comprising:

detecting a live synchronous multimedia collaboration session in a pre-existing messaging channel of the group-based communication system, the live synchronous multimedia collaboration session accessible to a plurality of channel members of the pre-existing messaging channel, the plurality of channel members comprising a plurality of participant users joined to the live synchronous multimedia collaboration session and a plurality of non-participant users not joined to the live synchronous multimedia collaboration session, wherein the pre-existing messaging channel provides a communications environment to display communications posted by the plurality of channel members;

generating in the pre-existing messaging channel of the group-based communication system, a collaboration thread associated with the live synchronous multimedia collaboration session;

causing display of the collaboration thread to the plurality of participant users and the plurality of non-participant users;

receiving a real-time audio segment during a first time period of the live synchronous multimedia collaboration session;

transmitting the real-time audio segment to the plurality of participant users without transmitting the real-time audio segment to the plurality of non-participant users;

transcribing the real-time audio segment into a real-time transcribed text segment;
posting, in real-time during the live synchronous multimedia collaboration session, a first message based on the real-time transcribed text segment to the collaboration thread associated with the live synchronous multimedia collaboration session;
receiving, from a non-participant user of the plurality of non-participant users, a real-time text input during a second time period of the live synchronous multimedia collaboration session;
determining an audio segment of the live synchronous multimedia collaboration session that corresponds to the second time period associated with the real-time text input;
transcribing the audio segment into a transcribed audio segment;
posting, in real-time during the live synchronous multimedia collaboration session, a second message, along with the transcribed audio segment, based on the real-time text input to the collaboration thread associated with the live synchronous multimedia collaboration session in the group-based communication system; and
updating in real-time during the live synchronous multimedia collaboration session, the collaboration thread displayed to the plurality of participant users and the plurality of non-participant users to include the first message, the second message, and the transcribed audio segment;
wherein the collaboration thread is persisted within the pre-existing messaging channel such that the collaboration thread is accessible to the plurality of channel members after termination of the live synchronous multimedia collaboration session.

2. The one or more non-transitory computer-readable media of claim 1, wherein the method further comprises:
receiving, after the live synchronous multimedia collaboration session has ended, textual input from the non-participant user of the synchronous multimedia collaboration session in response to the first message or the second message in the collaboration thread associated with the synchronous multimedia collaboration session; and
posting, after the live synchronous multimedia collaboration session has ended, a third message based on the textual input to the collaboration thread associated with the synchronous multimedia collaboration session.

3. The one or more non-transitory computer-readable media of claim 1, wherein the method further comprises:
causing the collaboration thread to be displayed to the non-participant user of the synchronous multimedia collaboration session;
receiving, from the non-participant user of the synchronous multimedia collaboration session, a request to join the synchronous multimedia collaboration session via a user interface control displayed in association with the collaboration thread; and
joining the non-participant user to the synchronous multimedia collaboration session.

4. The one or more non-transitory computer-readable media of claim 1, wherein the method further comprises:
receiving, during the live synchronous multimedia collaboration session, a reaction to the first message or the second message in the collaboration thread from the non-participant user of the synchronous multimedia collaboration session; and
posting, during the live synchronous multimedia collaboration session, the reaction in the collaboration thread associated with the synchronous multimedia collaboration session.

5. The one or more non-transitory computer-readable media of claim 1, wherein posting the first message further comprises:
including, with the first message, a link to media associated with the synchronous multimedia collaboration session.

6. The one or more non-transitory computer-readable media of claim 1, wherein the method further comprises:
posting a transcribed summary of the live synchronous multimedia collaboration session to the collaboration thread.

7. A method of documenting synchronous multimedia collaboration session in connection with a group-based communication system, the method comprising:
detecting a live synchronous multimedia collaboration session in a pre-existing messaging channel of the group-based communication system, the live synchronous multimedia collaboration session accessible to a plurality of channel members of the pre-existing messaging channel, the plurality of channel members comprising a plurality of participant users joined to the live synchronous multimedia collaboration session and a plurality of non-participant users not joined to the live synchronous multimedia collaboration session,
wherein the pre-existing messaging channel provides a communications environment to display communications posted by the plurality of channel members;
generating, in the pre-existing messaging channel of the group-based communication system, a collaboration thread associated with the live synchronous multimedia collaboration session;
causing display of the collaboration thread to the plurality of participant users and the plurality of non-participant users;
receiving a real-time audio segment during a first time period of the live synchronous multimedia collaboration session;
transcribing the real-time audio segment into a real-time transcribed text segment;
transmitting the real-time audio segment to the plurality of participant users without transmitting the real-time audio segment to the plurality of non-participant users;
posting, in real-time during the live synchronous multimedia collaboration session, a first message based on the real-time transcribed text segment to the collaboration thread associated with the live synchronous multimedia collaboration session;
receiving, from a non-participant user of the plurality of non-participant users, a real-time text input during a second time period of the live synchronous multimedia collaboration session;
determining an audio segment of the live synchronous multimedia collaboration session that corresponds to the second time period associated with the real-time text input;
transcribing the audio segment into a transcribed audio segment;
posting, in real-time during the live synchronous multimedia collaboration session, a second message, along with the transcribed audio segment, based on the real-time text input to the collaboration thread associated with the live synchronous multimedia collaboration session in the group-based communication system; and updating in real-time during the live synchronous multimedia collaboration session, the collaboration thread displayed to the plurality of participant users and the plurality of non-participant users to include the first message, the second message, and the transcribed audio segment;

wherein the collaboration thread is persisted within the pre-existing messaging channel such that the collaboration thread is accessible to the plurality of channel members after termination of the live synchronous multimedia collaboration session.

8. The method of claim 7, further comprising:
receiving, after the live synchronous multimedia collaboration session has ended, textual input from the non-participant user of the synchronous multimedia collaboration session in response to the first message or the second message in the collaboration thread associated with the synchronous multimedia collaboration session; and
posting, after the live synchronous multimedia collaboration session has ended, a third message based on the textual input to the collaboration thread associated with the synchronous multimedia collaboration session.

9. The method of claim 7, further comprising:
displaying a topic of discussion in connection with a header associated with the collaboration thread.

10. The method of claim 7, further comprising:
causing the collaboration thread to be displayed to the non-participant user of the synchronous multimedia collaboration session;
receiving, from the non-participant user of the synchronous multimedia collaboration session, a request to join the synchronous multimedia collaboration session via a user interface control displayed in association with the collaboration thread; and
joining the non-participant user to the synchronous multimedia collaboration session.

11. The method of claim 7, further comprising:
receiving, during the live synchronous multimedia collaboration session, a reaction to the first message or the second message in the collaboration thread from the non-participant user who has not joined the synchronous multimedia collaboration session; and
posting the reaction in the collaboration thread.

12. The method of claim 7, wherein posting the first message further comprises:
including, with the first message, a link to media associated with the synchronous multimedia collaboration session.

13. A system comprising at least one processor and at least one non-transitory memory storing computer executable instructions that when executed by the at least one processor cause the system to carry out actions comprising:
detecting a live synchronous multimedia collaboration session in a pre-existing messaging channel of a group-based communication system, the live synchronous multimedia collaboration session accessible to a plurality of channel members of the pre-existing messaging channel, the plurality of channel members comprising a plurality of participant users joined to the live synchronous multimedia collaboration session and a plurality of non-participant users not joined to the live synchronous multimedia collaboration session,
wherein the pre-existing messaging channel provides a communications environment to display communications posted by the plurality of channel members;
generating, in the pre-existing messaging channel of the group-based communication system, a collaboration thread associated with the live synchronous multimedia collaboration session;
causing display of the collaboration thread to the plurality of participant users and the plurality of non-participant users;
receiving a real-time audio segment during a first time period of the live synchronous multimedia collaboration session;
transmitting the real-time audio segment to the plurality of non-participant users;
transcribing the real-time audio segment into a real-time transcribed text segment;
posting, in real-time during the live synchronous multimedia collaboration session, a first message based on the real-time transcribed text segment to the collaboration thread associated with the live synchronous multimedia collaboration session;
receiving, from a non-participant user of the plurality of non-participant users, a real-time text input during a second time period of the live synchronous multimedia collaboration session;
determining an audio segment of the live synchronous multimedia collaboration session that corresponds to the second time period associated with the real-time text input;
transcribing the audio segment into a transcribed audio segment;
posting, in real-time during the live synchronous multimedia collaboration session, a second message, along with the transcribed audio segment, based on the real-time text input to the collaboration thread associated with the live synchronous multimedia collaboration session in the group-based communication system; and
updating in real-time during the live synchronous multimedia collaboration session, the collaboration thread displayed to the plurality of participant users and the plurality of non-participant users to include the first message, the second message, and the transcribed audio segment;
wherein the collaboration thread is persisted within the pre-existing messaging channel such that the collaboration thread is accessible to the plurality of channel members after termination of the live synchronous multimedia collaboration session.

14. The system of claim 13, wherein the actions further comprise:
receiving, after the live synchronous multimedia collaboration session has ended, textual input from the non-participant user of the live synchronous multimedia collaboration session in response to the first message or the second message in the collaboration thread associated with the live synchronous multimedia collaboration session; and
posting, after the live synchronous multimedia collaboration session has ended, a third message based on the textual input to the collaboration thread associated with the live synchronous multimedia collaboration session.

15. The system of claim 13, wherein the actions further comprise:
displaying a topic of discussion in connection with a header associated with the collaboration thread.

16. The system of claim 13, wherein the actions further comprise:

causing the collaboration thread to be displayed to the non-participant user of the live synchronous multimedia collaboration session;

receiving, from the non-participant user of the live synchronous multimedia collaboration session, a request to join the live synchronous multimedia collaboration session via a user interface control displayed in association with the collaboration thread; and joining the non-participant user to the live synchronous multimedia collaboration session.

17. The system of claim 13, wherein the actions further comprise:

receiving, during the live synchronous multimedia collaboration session, a reaction to the first message or the second message in the collaboration thread from the non-participant user of the live synchronous multimedia collaboration session; and posting, during the live synchronous multimedia collaboration session, the reaction in the collaboration thread associated with the live synchronous multimedia collaboration session.

18. The one or more non-transitory computer-readable media of claim 1, wherein the method further comprises:

assigning one or more action items to at least one of the first message or the second message; and determining that at least one action item of the one or more action items has been performed by at least one participant user of the plurality of participant users or at least one non-participant user of the plurality of non-participant users.

19. The one or more non-transitory computer-readable media of claim 1, wherein the method further comprises posting one or more audio segments corresponding to the live synchronous multimedia collaboration session to the collaboration thread such that the one or more audio segments are accessible to the plurality of participant users and the plurality of non-participant users after a conclusion of the live synchronous multimedia collaboration session.

20. The one or more non-transitory computer-readable media of claim 1, wherein the collaboration thread is generated as a first reply to a most recent message in the pre-existing messaging channel in which the live synchronous multimedia collaboration session was initiated.

* * * * *